(12) United States Patent
Feng et al.

(10) Patent No.: US 9,760,310 B2
(45) Date of Patent: Sep. 12, 2017

(54) HIGH PERFORMANCE DATA STORAGE MANAGEMENT USING DYNAMIC COMPRESSION

(71) Applicant: International Business Machines Corporation, Armonk, NY (US)

(72) Inventors: Yicheng Feng, Shanghai (CN); Shiwen He, Shanghai (CN); Jun Liao, Shanghai (CN); Dan Dan Wang, Shanghai (CN); Wen Bao Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/819,811

(22) Filed: Aug. 6, 2015

(65) Prior Publication Data

US 2017/0039000 A1 Feb. 9, 2017

(51) Int. Cl.
G06F 3/06 (2006.01)
G06F 12/08 (2016.01)
G06F 12/0868 (2016.01)

(52) U.S. Cl.
CPC .......... *G06F 3/0656* (2013.01); *G06F 3/0608* (2013.01); *G06F 3/0638* (2013.01); *G06F 3/0683* (2013.01); *G06F 12/0868* (2013.01)

(58) Field of Classification Search
CPC ............... G06F 3/0611; G06F 12/0868; G06F 12/0888; G06F 12/12
See application file for complete search history.

(56) References Cited

U.S. PATENT DOCUMENTS

| | | | |
|---|---|---|---|
| 6,173,381 B1* | 1/2001 | Dye | G06F 12/08 345/555 |
| 7,702,875 B1* | 4/2010 | Ekman | G06F 12/08 710/68 |
| 8,478,731 B1 | 7/2013 | Throop et al. | |
| 8,516,005 B2* | 8/2013 | Ergan | G06F 12/0802 707/802 |
| 8,719,529 B2 | 5/2014 | Benhase et al. | |
| 8,745,338 B1 | 6/2014 | Yadav et al. | |
| 2012/0185648 A1* | 7/2012 | Benhase | G06F 12/08 711/118 |
| 2013/0067175 A1 | 3/2013 | Yadav et al. | |
| 2013/0246727 A1* | 9/2013 | Hikono | G06F 13/1605 711/163 |
| 2016/0124867 A1* | 5/2016 | Oportus Valenzuela | G06F 12/12 711/159 |

FOREIGN PATENT DOCUMENTS

| CN | 102609360 A | 7/2012 |
|---|---|---|
| CN | 104239230 A | 12/2014 |

* cited by examiner

*Primary Examiner* — Hal Schnee
(74) *Attorney, Agent, or Firm* — Gilbert Harmon, Jr.

(57) ABSTRACT

Embodiments of the present invention allow a data segment stored in a compressed format to be directly staged into a cache allowing access to the data segment. In operation, a request to access a data segment is received. In response, whether the data segment is stored in a compressed format is determined. If the data segment is stored in the compressed format, the data segment is staged directly into a cache.

15 Claims, 4 Drawing Sheets

HIGH PERFORMANCE DATA STORAGE MANAGEMENT USING DYNAMIC COMPRESSION

BACKGROUND

With the development of computing technology, large amounts of data are generated for various purposes. The data is stored and organized in a variety of devices such as personal computers, mobile terminals, servers, dedicated storage devices and the like. The data usually needs to be migrated between different storage media including volatile storage and non-volatile storage. Examples of volatile storage include, but are not limited to, random access memory (RAM), cache memory, and the like. Examples of non-volatile storage include, but are not limited to, hard disk drives (HDDs), serial advanced technology attachment (SATA) disk drives, solid state drives (SSDs), tape drives, and the like. Storage and migration of the data have a direct impact on the overall performance of the devices.

SUMMARY

In one aspect, a computer-implemented method is proposed. According to the method, a request to access a data segment is received. Then, whether the data segment is stored in a compressed format is determined. In response to determining that the data segment is stored in the compressed format, the data segment directly is staged into a cache to allow the access to the data segment.

In another aspect, a device is proposed. The device includes one or more processors and a memory coupled to at least one of the processors. A set of computer program instructions are stored in the memory and executed by at least one of the processors in order to perform actions. The actions include receiving a request to access a data segment, determining whether the data segment is stored in a compressed format, and staging the data segment directly into a cache to allow the access to the data segment in response to determining that the data segment is stored in the compressed format.

In yet another embodiment, a computer program product is proposed. The computer program product is tangibly stored on a non-transient machine readable medium and comprising executable instructions which, when executed on a device, cause the device to receive a request to access a data segment, determine whether the data segment is stored in a compressed format, and stage the data segment directly into a cache to allow the access to the data segment in response to determining that the data segment is stored in the compressed format.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar element.

DETAILED DESCRIPTION

Embodiments of the present invention will now be described with reference to the figures. It is to be understood that these embodiments are described only for the purpose of illustration and help those skilled in the art to understand and implement the present invention, without suggesting any limitations as to the scope of the invention. The invention described herein can be implemented in various manners other than the ones describe herein.

As used herein, the term "includes" and its variants are defined as open terms, i.e., meaning "includes, but is not limited to." The phrase "based on" is defined as "based at least in part on." The phrases "one embodiment" and "an embodiment" are defined as "at least one embodiment." The phrase "another embodiment" is defined as "at least one other embodiment." Other definitions, explicit and implicit, may be included below.

Figure 1:
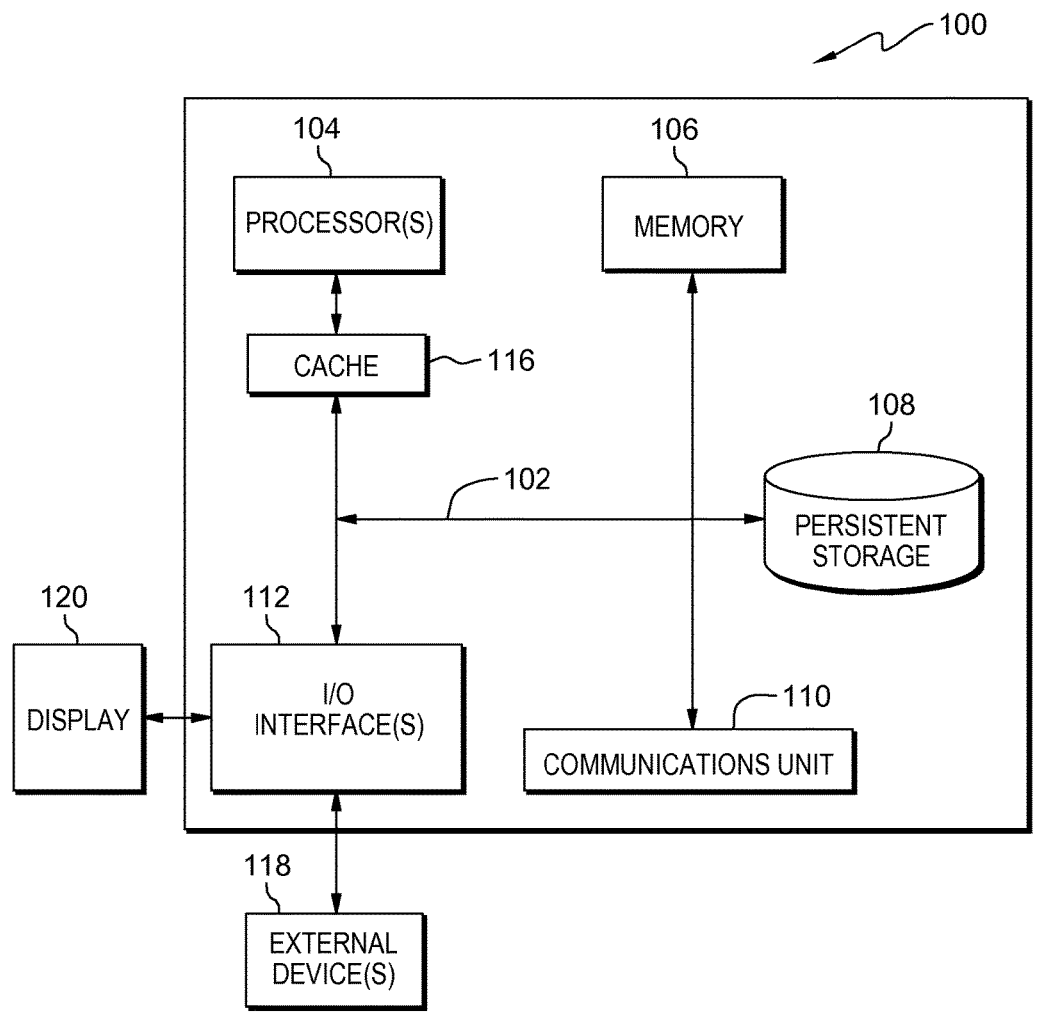
FIG. 1 is a block diagram of a device in which embodiments of the present invention can be implemented.

Looking to FIG. 1, depicted is an exemplary device, referred to as computer system/server 100, applicable to implement the embodiments of the present invention. Computer system/server 100 is illustrative and not intended to suggest any limitation as to the scope of use or functionality of embodiments of the invention described herein. Computer system/server 100 includes communications fabric 102, which provides communications between computer processor(s) 104, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Computer system 100 includes processors 104, cache 116, memory 106, persistent storage 108, communications unit 110, input/output (I/O) interface(s) 112 and communications fabric 102. Communications fabric 102 provides communications between cache 116, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data, and data near recently accessed data, from memory 106.

Program instructions and data used to practice embodiments of the present invention may be stored in persistent storage 108 and in memory 106 for execution by one or more of the respective processors 104 via cache 116. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments of the present invention may be downloaded to persistent storage 408 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 112. I/O interface(s) 112 also connect to display 120.

Display 120 provides a mechanism to display data to a user and may be, for example, a computer monitor.

Embodiments of the present invention can be implemented in various storage environments. In some embodiments, an environment may include a non-compressed storage medium, a compressed storage medium and a cache. A data segment stored on the compressed storage medium may be staged from the compressed storage medium directly into the cache, without being transferred through the non-compressed storage medium, such that the data segment can be accessed in a more quickly and efficiently way. Alternatively, an environment may include a cache and a non-compressed storage medium, and the non-compressed storage medium may contain at least two portions, for example, a first portion for storing data segment(s) in a non-compressed format and a second portion for storing data segment(s) in a compressed format. A data segment stored on a first portion in the compressed format can be staged from the second portion directly into the cache, without being transferred through the first portion. Accordingly, in both cases, the data segment can be accessed in a more quickly and efficiently way.

Figure 2A:
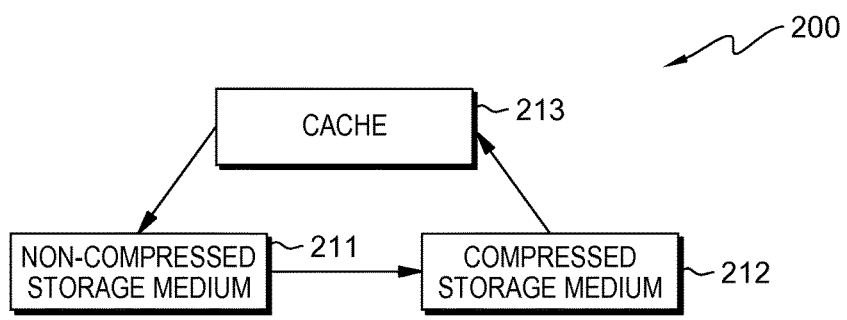
FIGS. 2A-2B are schematic diagrams of environments in which embodiments of the present invention can be implemented.

Next, FIG. 2A depicts a schematic diagram of an environment 200 in which embodiments of the present invention can be implemented. It should be noted that environment 200 can be a device that stores data. For example, in some embodiments, environment 200 can be implemented as the computer system/server 100 shown in FIG. 1. Embodiments of the present invention are applicable to any other suitable computing device, either known at present or developed in the future.

In the example shown in FIG. 2A, the environment 200 includes a non-compressed storage medium 211, a compressed storage medium 212 and a cache 213. The non-compressed storage medium 211 can be a medium on which a data segment can be stored in a non-compressed form. As used herein, data segment refers to a chunk of data wherein the size of the data segment can be fixed or variable. For instance, a data segment may comprise one or more extents or units. For the sake of discussion, the non-compressed storage medium 211 can be referred to as a "general medium."

The compressed storage medium 212 is a medium on which data segments can be stored in a compressed format. For the sake of discussion, the compressed storage medium 212 can be referred to as a "compressed medium." Generally speaking, the access speed of a general medium is faster than that of a compressed medium. The compressed medium is more efficient in terms of cost of storage space. That is, compared with the general medium, a data segment occupies less capacity on the compressed medium.

In embodiments of the present invention, the non-compressed storage medium 211 and/or the compressed storage medium 212 can be, for example, but is not limited to, an electronic storage device, a magnetic storage device, an optical storage device, an electromagnetic storage device, a semiconductor storage device, or any suitable combination of the foregoing. Examples of the non-compressed storage medium 211 and/or the compressed storage medium 212 include, but are not limited to, a hard disk, a portable computer diskette, a random access memory (RAM), a read-only memory (ROM), an erasable programmable read-only memory (EPROM or Flash memory), a static random access memory (SRAM), a memory stick, a virtual disk and the like.

The cache or memory cache 213 is a high-speed memory. The cache 213 is used to store data that has been accessed previously in order to facilitate the future access thereof. A cache hit occurs if the requested data is found in the cache, while a cache miss occurs if the requested data is not found in the cache. If the requested data is hit, the data can be directly read out from the cache 213, which is faster than re-computing a result or reading the requested data from a storage medium.

Conventionally, the cache 213 only communicates with the non-compressed storage medium 211. More particularly, when a request for accessing a data segment stored on the compressed storage medium 212 is received, the data segment is read from the compressed storage medium 212 and decompressed. The decompressed data is migrated from the compressed storage medium 212 to the non-compressed storage medium 211 and fed into the cache 213. That is, no direct communication is enabled between the compressed storage medium 212 and the cache 213. Such migration mechanism consumes more time and capacity and thus degrades the performance of the device 200.

In accordance with embodiments of the present invention, the data segment stored on the compressed storage medium 212 can be staged from the compressed storage medium 212 directly into the cache 213, without being transferred through the non-compressed storage medium 211. In this way, the non-compressed storage medium 211 can be bypassed. Further, even if the non-compressed storage medium 211 has no more capacity, the data segment can be staged from the compressed storage medium 212 into the cache 213 successfully. Accordingly, improvement in the access speed in the absence of the non-compressed storage medium 211 leads to access of the data segment much more quickly and efficiently.

Figure 2B:
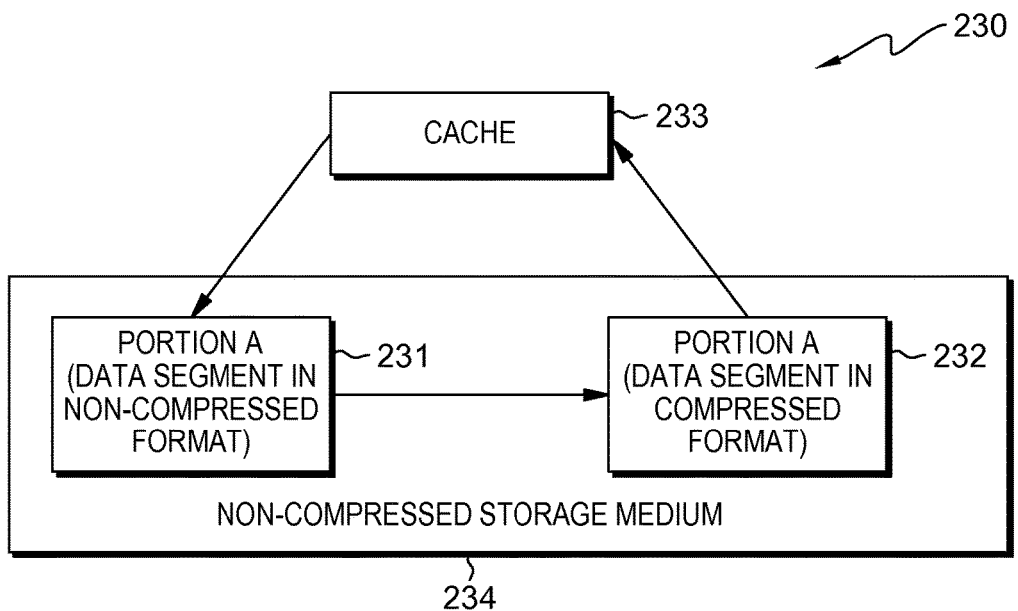

FIG. 2B shows a schematic diagram of another environment 230 in which embodiments of the present invention can be implemented. The environment 230 may be a device, for example, implemented as the computer system/server 100 shown in FIG. 1. As shown, the environment 230 in this example includes a cache 233 and a non-compressed storage medium 234. The non-compressed storage medium 234 and the cache 233 are similar to the non-compressed storage medium 211 and the cache 213 as discussed with reference to FIG. 2A, which will not be repeated here.

The non-compressed storage medium 234 includes at least two portions, namely, a portion A 231 for storing data segment(s) in a non-compressed format and a portion B 232 for storing data segment(s) in a compressed format. The portion A 231 can be considered a general medium while the portion B 232 can be considered a compressed medium. Conventionally, when a request for accessing a data segment stored on the portion B 232 in the compressed format is received, the data segment is first transferred into the portion A 231 and then fed into the cache 233, which consumes much more time.

In accordance with embodiments of the present invention, the data segment stored on the portion B 232 in the compressed format can be staged from the portion B 232 directly into the cache 233, without being transferred through the portion A 231. As such, the data segment can be accessed much more quickly and efficiently.

It should be noted that the configurations of FIGS. 2A and 2B are described merely for the purpose of illustration, without suggesting any limitation as to the scope of the invention. Those skilled in the art will appreciate that various other configurations of components in the environment 200 or 230 are contemplated.

In some embodiments, bi-directional communications between the cache and compressed storage or portion is allowed. That is, in addition to the data staging from the compressed storage or portion to the cache as described above, data in the cache can be destaged directly to the compressed storage or portion. For example, in some embodiments, one or more data segments in the cache 213, 233 can be destaged to the compressed storage medium 212 or the portion B 232 if one or more conditions are met. Alternatively, it is also possible to destage one or more data segments from the cache to the non-compressed storage medium 211 or the portion A 231 in a non-compressed format.

Figure 3:
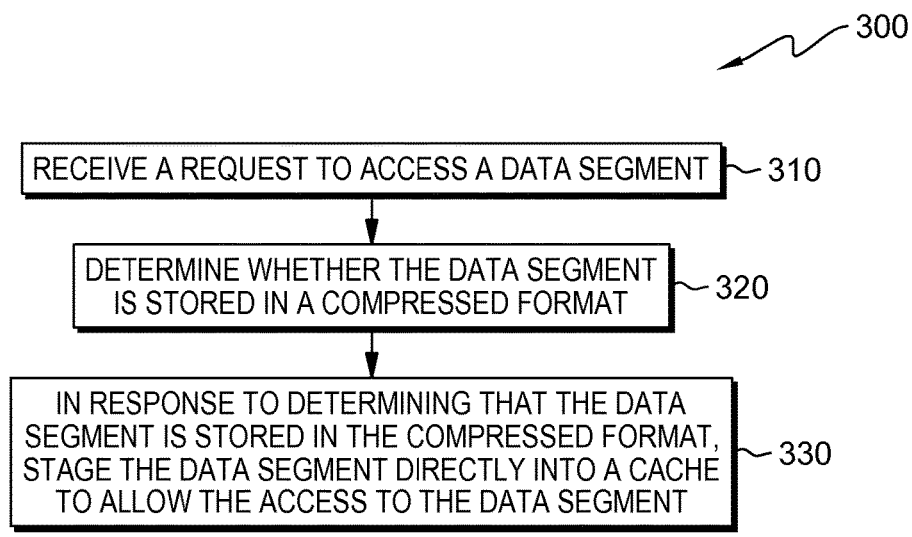
FIG. 3 is a flow chart of a method for accessing a data segment in accordance with embodiments of the present invention.

Turning to FIG. 3, depicted is a flow chart of a method 300 for accessing a data segment in accordance with embodiments of the present invention. The method 300 can be, at least in part, implemented in environment 200 or environment 230, for example.

The method 300 begins at step 310, where a request to access a data segment is received. The access to a data segment can be initiated from a client and can comprise operations such as reading the data segment, updating the data segment, or the like.

In response to the request, the method 300 then proceeds to step 320. In step 320, it is determined whether the data segment is stored in a compressed format. In some embodiments, it is determined whether the requested data segment is stored on a compressed storage medium such as the compressed storage medium 212 shown in FIG. 2A. If so, the requested data segment is determined to be stored in the compressed format.

According to embodiments of the present invention, there may be several ways to determine whether the data segment is stored on a compressed storage medium. In one embodiment, the device can record the storage location of each data segment. For instance, when the storage location of a data segment is changed, the relevant record can be updated. For example, when a data segment is migrated from the non-compressed storage medium 211 into the compressed storage medium 212, the storage information of the data segment is updated. Such information on storage location can be used in step 320. More particularly, by checking the storage information of the requested data segment, it can be determined whether the data segment is stored on a compressed storage medium.

Alternatively, in step 320, it can be determined whether the requested data segment is compressed and stored on a non-compressed storage medium. If yes, the data segment is determined to be stored in the compressed format. By way of example, in the embodiments shown in FIG. 2B, the portion B 232 of the non-compressed storage medium 234 stores data segment(s) in the compressed format. Accordingly, if the requested data segment is stored in the portion B 232, it can be determined that the data segment is stored in the compressed format. In some embodiments, information on storage location can be used to determine if the subject data segment is stored in the compressed format. For example, in such embodiments, when a data segment is migrated between the compressed portion and the non-compressed portion, the relevant record can be updated to reflect the new storage location. By checking the record in step 320, it is possible to determine whether the data is stored on a non-compressed medium but in a compressed format.

It should be understood that these embodiments are described only for the purpose of illustration to help those skilled in the art to understand and implement the present invention, without suggesting any limitations as to the scope of the invention. It should be noted that whether the data segment is stored in a compressed format may be determined in other suitable ways.

In step 330, if it is determined in step 320 that the data segment is stored in the compressed format, the data segment is staged directly into a cache allowing access to the data segment. That is, contrary to conventional solutions mentioned above, the data segment is placed into the cache without being transferred into an intermediate non-compressed storage medium or portion.

In some embodiments, if the data segment is stored on the compressed storage medium 212, in step 330, the data segment can be staged from the compressed storage medium 212 directly into the cache 213, without involving the non-compressed storage medium 212. During the staging from the compressed storage medium 212, decompression of the data segment can be performed in background. Accordingly, the data segment staged into the cache is in the non-compressed format.

Alternatively, in some embodiments, if the data segment is stored on a non-compressed storage medium but compressed (for example, stored on the portion B 232 of the non-compressed storage medium 234), in step 330, the data segment can be directly staged from the portion B 232 into the cache 233, without involving the portion A 231. According to embodiments of the present invention, the decompression of the data segment can be performed before or after the staging, depending on the specific requirements or configuration. In this way, the data segment staged into the cache is in the non-compressed format.

Staging the data segment into the cache 213, 233, the response to the request comprises directly reading the data segment from the cache 213 or 233. Enabling the direct communication between the compressed medium and the cache and by-passing the general medium, reduces the access time to the data segment, shortens the response time and improves the user experience.

As mentioned above, in addition to the direct staging of data to the cache, some embodiments of the present invention enable direct destaging of the data from the cache to the compressed storage medium or portion. As is known by those skilled in the art, the data segments in the cache can be destaged from the cache when necessary. Many mechanisms can manage destaging of the data segments, including, but not limited to, First-In-First-Out (FIFO), a Least Recently Used (LRU) algorithm, a Least Frequently Used (LFU) algorithm, statistical information of access history of the data segment, and the like. Conventionally, the data can be destaged to only the non-compressed storage medium or portion. On the contrary, embodiments of the present invention can adaptively select the destination of the destaging, for example, based on the "hot degree" of data segments.

As used herein, the hot degree is a metric indicating how frequently a data segment is accessed. The hot degree can be indicated by the access count of the data segment within a given time period. Generally speaking, a data segment is destaged from the cache when the hot degree is relatively low. That is, what is destaged from the cache is usually the "cold" data that is less frequently accessed in the given time period. In some embodiments, it is further determined the cold level of the destaged data. If the hot degree is below a predetermined threshold, the data segment is rarely accessed and thus is "extremely cold." Such extremely cold data can be directly destaged into the compressed storage medium 212, or to the portion B 232 of the non-compressed medium 234 in the compressed format. This is beneficial because it is reasonable to assume that the "extremely cold" data will probably not be accessed in a near future. By storing such data directly in the compressed format, the capacity of the non-compressed storage medium or portion can be saved.

On the other hand, if the hot degree of the data segment to be destaged exceeds the low threshold, it means that although the data segment is cold, it is not very cold yet. Such data segment can be destaged to the non-compressed storage medium or the portion A, e.g., destaged to the non-compressed storage medium 211 or the portion A 231 in the non-compressed format.

Figure 4:
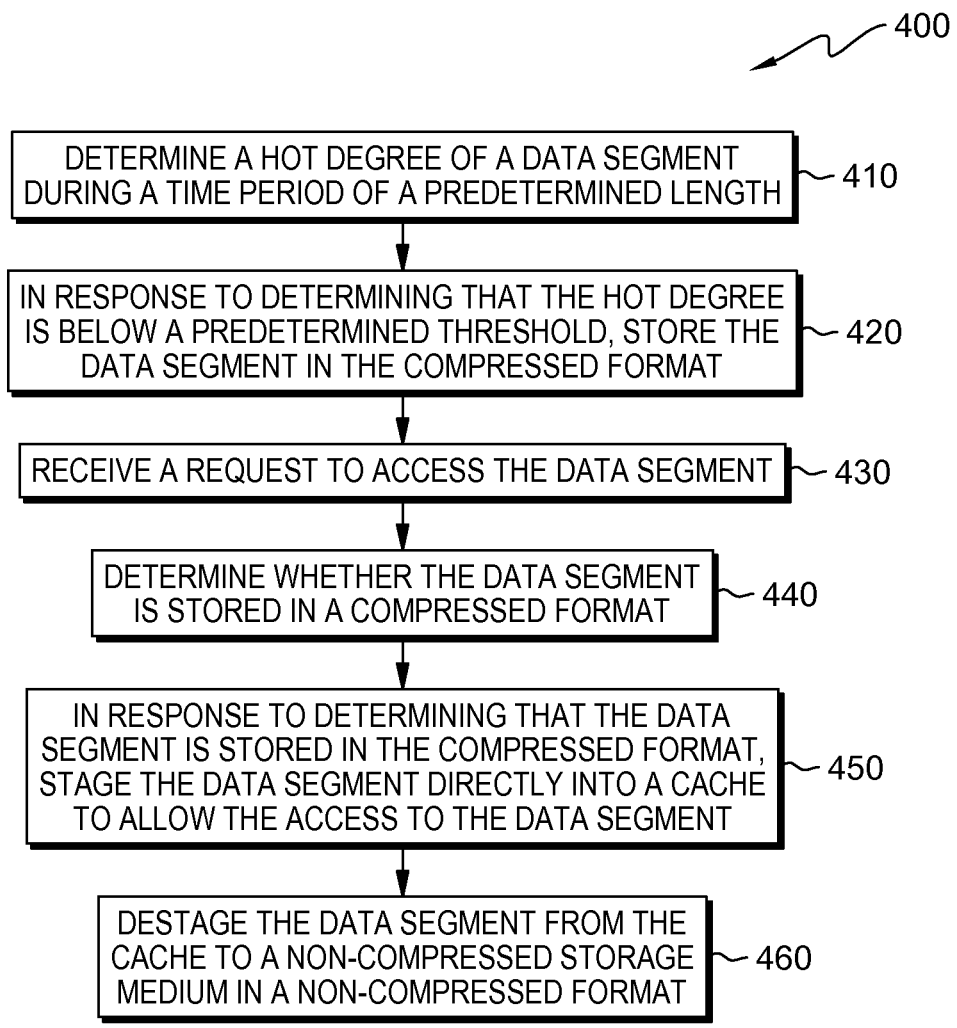
FIG. 4 is a flow chart of a method for accessing a data segment in accordance with further embodiments of the present invention.

FIG. 4 depicts a flow chart of a method 400 for accessing a data segment in accordance with embodiments of the present invention. The method 400 is an alternative implementation of the method 300.

In step 410, a hot degree of a data segment is determined during a time period of a predetermined length. As described above, the hot degree of a data segment can be determined in a variety of ways. In one embodiment, the hot degree can be determined as an access count of the data segment in the time period. The access count indicates the number of accesses to the data segment in the time period. If the access count is below a predetermined threshold, it is determined that the data segment is cold. The length of the time period can be predetermined according to system requirements, for example, 30 minutes, 1 hour, 12 hours, a day and so on.

There are various ways to determine an access count of the data segment in the time period. In some embodiments, the time period is divided into a plurality of sub-periods and an access sub-count of the data segment can be determined in each of the plurality of sub-periods. The access count of the data segment can then be determined in the time period based on the determined access sub-counts of the data segment in the plurality of sub-periods.

Figure 5:
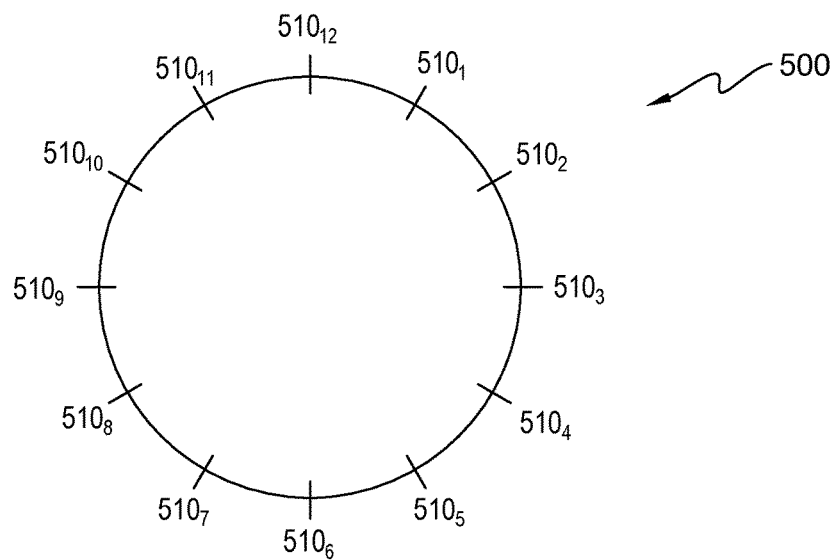
FIG. 5 is a schematic diagram of a graphical representation of storing a data segment in a compressed format in accordance with embodiments of the present invention.

Looking to FIG. 5, depicted is an example of access sub-counts based on sub-periods. A time period of 12 hours is divided into N sub-periods, where N=12. Accordingly, a sub-period corresponds to 1 hour. As shown in FIG. 5, a ring 500 represents the time period and it is divided by positions $510_1$, $510_2$, ..., $510_{12}$ into 12 intervals. Each interval represents a sub-period and equals 1 hour. For a data segment, an access sub-count (denoted as "$count_i$") in a sub-period (denoted as "$sub\text{-}period_i$") can be determined, for example, by counting the number of accesses to the data segment in the sub-period, where i=1, 2, ..., N. Based thereon, the access count of the data segment in the time period can be determined by accumulating the access sub-counts in the plurality of sub-periods. In other words, the access count (denoted as "AC") in the time period can be calculated by:

$$AC = \sum_{i=1}^{N} count_i \qquad (1)$$

Alternatively, or in addition, in some embodiments, the access count of the data segment in a part of the time period can be determined based on access sub-counts of the data segment in the plurality of sub-periods. By way of example, the access count in a period corresponds to from the position $510_2$ to the position $510_7$, calculated by accumulating the access sub-counts for the sub-periods 2 to 7.

According to embodiments of the present invention, the access sub-counts, for example AC, i.e., $count_i$ (i=1, ..., N), can be added to metadata of the data segment or any other accessible places.

It should be noted that the above embodiments are described only for the purpose of illustration to help those skilled in the art to understand and implement the present invention, without suggesting any limitations as to the scope of the invention. There may be many other ways to determine the hot degree of a data segment. By way of example, whether a data segment is hot or cold may be determined based on a Least Recently Used (LRU) algorithm, a Least Frequently Used (LFU) algorithm, a FIFO algorithm, statistical information of access history of the data segment, and the like.

Returning to FIG. 4, in step 420, if it is determined that the hot degree is below a predetermined threshold, the data segment is stored in the compressed format. This can be accomplished by several mechanisms, for example, in one embodiment, the data segment can be migrated from a non-compressed storage medium to a compressed storage medium. Considering the embodiment shown in FIG. 2A as an example, if it is determined that the hot degree is below the predetermined threshold, that is, if the data segment is determined to be cold, the data segment can be migrated from the non-compressed storage medium 211 to the compressed storage medium 212. During the migration, the data segment can be compressed and then stored in compressed storage medium 212.

Alternatively, in another embodiment, the data segment may be compressed and then stored in a non-compressed medium. Considering the embodiment shown in FIG. 2B as an example, if the data segment is determined to be cold, the data segment which is non-compressed and stored in the portion A 231 of the non-compressed storage medium 234 can be compressed, and then the compressed data segment can be stored in the portion B 232 of the non-compressed storage medium 234. In this way, the data segment is stored in the compressed format.

Figure 6:
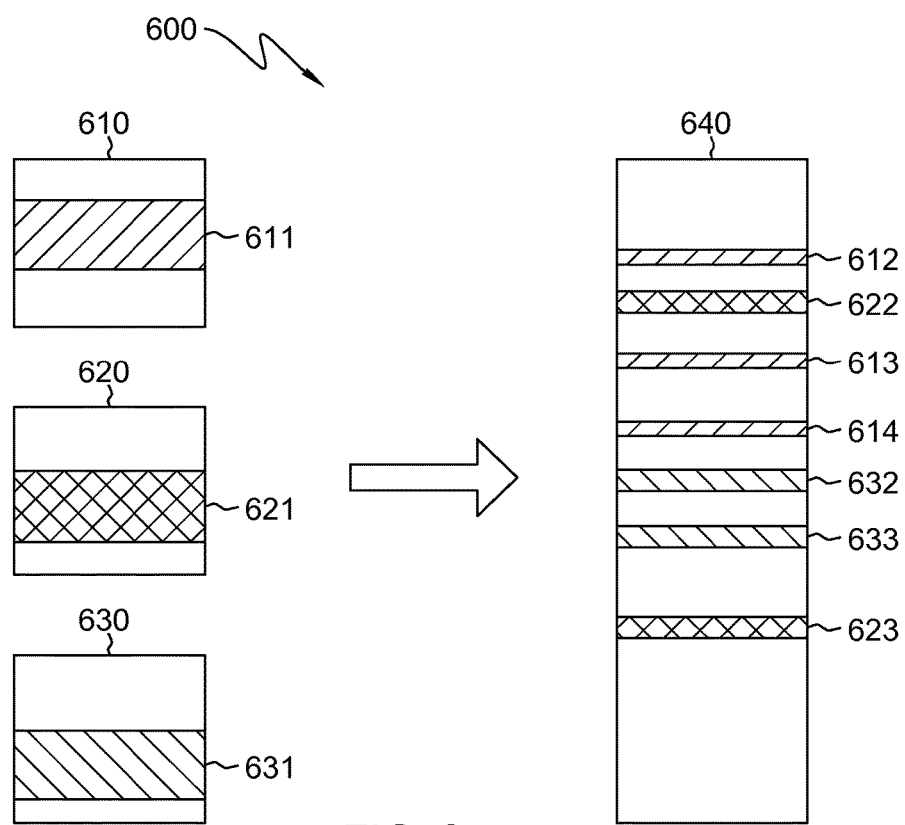
FIG. 6 is a schematic diagram of a graphical representation of determining an access count of a data segment in accordance with embodiments of the present invention.

Continuing, an example will be discussed with reference to FIG. 6. FIG. 6 shows a schematic diagram of a graphical representation of determining an access count of a data segment in accordance with embodiments of the present invention. In this example, it is determined that a data segment 611, stored in a non-compressed storage medium 610, is cold. Accordingly, the data segment 611 can be migrated to a compressed storage medium 640. The migrated data can be stored in the compressed storage medium 640 in a continuous or separate manner. As shown in FIG. 6, the data segment 611 is migrated to three separate parts, namely, storage areas 612, 613 and 614 of the compressed storage medium 640. It should be noted that this example is illustrated for purpose of discussion rather than limitation. In some embodiments, the data segment 611 may be migrated to the compressed storage medium 640 in a continuous part.

In the example shown in FIG. 6, the compressed storage medium 640 may be shared by multiple non-compressed storage media 610, 620 and 630. As such, if a data segment 621 stored in the non-compressed storage medium 620 and a data segment 631 stored in the non-compressed storage medium 630 are cold, the data segments 621 and 631 can be migrated to the compressed storage medium 640 in a similar way. As shown in FIG. 6, the data segment 621 can be migrated to two separate parts 622 and 623 of the compressed storage medium 640, and the data segment 631 can be migrated to two separate parts 632 and 633 of the compressed storage medium 640.

According to embodiments of the present invention, the compressed storage medium 640 can be configured by means of various techniques, such as thin provision, scale-out, load balance and the like. It should be noted the above examples are shown for discussion rather than limitation. Those skilled in the art will appreciate the compressed storage medium 640 may be configured in other suitable ways.

According to embodiments of the present invention, when the data segment is stored in the compressed format, storage information of the data segment can be recorded. The storage information of the data segment can comprise the new storage location of the data segment stored in the compressed form. By way of example, the storage information of the data segments 611, 621 and 631 can be as depicted in TABLE 1.

TABLE 1

| Data Segment ID | Storage Location |
|---|---|
| Data Segment 611 | Areas 612, 613 and 614 of Compressed storage medium 640 |
| Data Segment 621 | Areas 622 and 623 of Compressed storage medium 640 |
| Data Segment 631 | Areas 632 and 633 of Compressed storage medium 640 |

By checking the storage information shown in TABLE 1, if a record of a data segment can be found in the TABLE 1, it can be determined that the data segment is stored in the compressed format. It should be noted that the examples shown in TABLE 1 are for purpose of illustration rather than limitation. Those skilled in the art will appreciate that the storage information of a data segment may have other suitable forms or contents. By way of example, for a data segment originally located in the portion A 231, when it is compressed and stored in the portion B 232 of the non-compressed storage medium 234, the storage information of the data segment can comprise identification (ID) of the data segment and its storage location on the non-compressed storage medium 234.

In step 430, a request to access the data segment is received. In response, in step 440, it is determined whether the data segment is stored in a compressed format. If so, in step 450, the data segment is staged directly into a cache to allow access to the data segment. Steps 430 to 450 are similar to steps 310 to 330 in the method 300 as discussed with reference to FIG. 3 and will not be repeated.

Next, in step 460, the data segment is destaged from the cache to a non-compressed storage medium in a non-compressed format. Particularly, as discussed above, if the data segment is determined to be extremely cold, the data segment can be destaged directly in the compressed format, for example, to the compressed storage medium 212 or the portion B 232 of the non-compressed storage medium 234. Otherwise, the data segment can be destaged from the cache to a non-compressed storage medium (such as the non-compressed storage medium 211 or the portion A 231 of the non-compressed storage medium 234) in a non-compressed format.

The method 300 and/or 400 can be implemented by computer programs. For example, the computer programs, when executed by a processor on a device (such as the computer system 100 shown in FIG. 1, the device 200 shown in FIG. 2A or the device 230 shown in FIG. 2B), may be loaded into the memory and cause the device to implement the method 300 and/or 400.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for data storage management using dynamic compression, the computer-implemented method comprising:
   receiving, by one or more computer processors, a request to access a data segment;
   determining, by the one or more computer processors, whether the data segment is stored in a compressed format;
   responsive to determining that the data segment is stored in the compressed format on a compressed storage medium, staging, by the one or more computer processors, the data segment directly into a cache from the compressed storage medium and decompressing the data segment;

responsive to determining that the data segment is stored in the compressed format on a non-compressed storage medium, staging, by the one or more computer processors, the data segment directly into the cache from the non-compressed storage medium and decompressing the data segment;

determining, by the one or more computer processors, a hot degree of the data segment during a time period of a predetermined length;

responsive to determining that the hot degree is below a predetermined threshold, destaging, by the one or more computer processors, the data segment from the cache, compressing, the data segment to create a compressed data segment and storing the compressed data segment; and responsive to determining that the hot degree is below a second predetermined threshold and determining that the data segment is not stored in the compressed format on a non-compressed storage medium, migrating, by the one or more computer processors, the data segment by compressing the data segment and storing the data segment in the non-compressed storage medium in the compressed format or compressing the data segment and storing the data segment in the compressed storage medium in the compressed format.

2. The computer-implemented method of claim 1, further comprising:

responsive to determining that the hot degree is below a first predetermined threshold, destaging, by the one or more computer processors, the data segment from the cache to the non-compressed storage medium in the non-compressed format.

3. The computer-implemented method of claim 1, wherein determining the hot degree of the data segment during the time period comprises:

determining, by the one or more computer processors, an access count of the data segment in the time period as the hot degree.

4. The computer-implemented method of claim 3, wherein determining an access count of the data segment in the time period comprises:

dividing the time period into a plurality of sub-periods;
determining a sub-count of the data segment for each of the plurality of sub-periods; and
determining the access count of the data segment in the time period based on the sub-count of the data segment for each of the plurality of sub-periods.

5. The computer-implemented method of claim 1, wherein storing the compressed data segment comprises one of:

storing, by the one or more computer processors, the compressed data segment in the compressed storage medium; or
storing, by the one or more computer processors, the compressed data segment in the non-compressed storage medium.

6. A device for data storage management using dynamic compression, the device comprising:

one or more processors;
a memory coupled to at least one of the processors;
a set of computer program instructions stored in the memory and executed by at least one of the processors in order to perform actions comprising:

receiving, by one or more computer processors, a request to access a data segment;

determining, by the one or more computer processors, whether the data segment is stored in a compressed format;

responsive to determining that the data segment is stored in the compressed format on a compressed storage medium, staging, by the one or more computer processors, the data segment directly into a cache from the compressed storage medium and decompressing the data segment;

responsive to determining that the data segment is stored in the compressed format on a non-compressed storage medium, staging, by the one or more computer processors, the data segment directly into the cache from the non-compressed storage medium and decompressing the data segment;

determining, by the one or more computer processors, a hot degree of the data segment during a time period of a predetermined length;

responsive to determining that the hot degree is below a predetermined threshold, destaging, by the one or more computer processors, the data segment from the cache, compressing, the data segment to create a compressed data segment and storing the compressed data segment; and responsive to determining that the hot degree is below a second predetermined threshold and determining that the data segment is not stored in the compressed format on a non-compressed storage medium, migrating, by the one or more computer processors, the data segment by compressing the data segment and storing the data segment in the non-compressed storage medium in the compressed format or compressing the data segment and storing the data segment in the compressed storage medium in the compressed format.

7. The device of claim 6, wherein the actions further comprise:

responsive to determining that the hot degree is below a first predetermined threshold, destaging, by the one or more computer processors, the data segment from the cache to the non-compressed storage medium in the non-compressed format.

8. The device of claim 6, wherein the actions further comprise:

determining, by the one or more computer processors, an access count of the data segment in the time period as the hot degree.

9. The device of claim 8, wherein the actions further including:

dividing the time period into a plurality of sub-periods;
determining a sub-count of the data segment for each of the plurality of sub-periods; and
determining the access count of the data segment in the time period based on the sub-count of the data segment for each of the plurality of sub-periods.

10. The device of claim 6, wherein storing the compressed data segment comprises one of:

storing, by the one or more computer processors, the compressed data segment in the compressed storage medium; or
storing, by the one or more computer processors, the compressed data segment in the non-compressed storage medium.

11. A computer program product for data storage management using dynamic compression, the computer program product comprising:
   one or more non-transient computer readable storage media and program instructions tangibly stored on the one or more non-transient computer readable storage media, the program instructions comprising:
      program instructions to receive, by one or more computer processors, a request to access a data segment;
      program instructions to determine, by the one or more computer processors, whether the data segment is stored in a compressed format;
      program instructions to respond to determining that the data segment is stored in the compressed format on a compressed storage medium, staging, by the one or more computer processors, the data segment directly into a cache from the compressed storage medium and decompressing the data segment;
      program instructions to respond to determining that the data segment is stored in the compressed format on a non-compressed storage medium, staging, by the one or more computer processors, the data segment directly into the cache from the non-compressed storage medium and decompressing the data segment;
      program instructions to determine, by the one or more computer processors, a hot degree of the data segment during a time period of a predetermined length;
      program instructions to respond to determine that the hot degree is below a predetermined threshold, destaging, by the one or more computer processors, the data segment from the cache, compressing, the data segment to create a compressed data segment and storing the compressed data segment; and
      program instructions to respond to determine that the hot degree is below a second predetermined threshold and determine that the data segment is not stored in the compressed format on a non-compressed storage medium, migrating, by the one or more computer processors, the data segment by compressing the data segment and storing the data segment in the non-compressed storage medium in the compressed format or compressing the data segment and storing the data segment in the compressed storage medium in the compressed format.

12. The computer program product of claim 11, further comprising:
   responsive to determining that the hot degree is below a first predetermined threshold, program instructions to destage, by the one or more computer processors, the data segment from the cache to the non-compressed storage medium in the non-compressed format.

13. The computer program product of claim 11, wherein determining the hot degree of the data segment during the time period comprises:
   determining, by the one or more computer processors, an access count of the data segment in the time period as the hot degree.

14. The computer program product of claim 13, wherein determining an access count of the data segment in the time period comprises:
   dividing the time period into a plurality of sub-periods;
   determining a sub-count of the data segment for each of the plurality of sub-periods; and
   determining the access count of the data segment in the time period based on the sub-count of the data segment for each of the plurality of sub-periods.

15. The computer program product of claim 11, wherein storing the compressed data segment comprises one of:
   storing, by the one or more computer processors, the compressed data segment in the compressed storage medium; or
   storing, by the one or more computer processors, the compressed data segment in the non-compressed storage medium.

* * * * *